C. E. BEROLD.
PLANING MACHINE ATTACHMENT.
APPLICATION FILED DEC. 7, 1908.

1,004,619.

Patented Oct. 3, 1911.

Witnesses
C. M. Fahnestock
Arthur H. Ewald

Inventor
Charles E. Berold
by Alfred M. Allen
Attorney

UNITED STATES PATENT OFFICE.

CHARLES E. BEROLD, OF CINCINNATI, OHIO, ASSIGNOR TO THE PRINTING MACHINERY COMPANY, OF CINCINNATI, OHIO, A CORPORATION OF OHIO.

PLANING-MACHINE ATTACHMENT.

1,004,619.  Specification of Letters Patent.  Patented Oct. 3, 1911.

Application filed December 7, 1908. Serial No. 466,348.

*To all whom it may concern:*

Be it known that I, CHARLES E. BEROLD, a citizen of the United States, residing in Cincinnati, in the county of Hamilton and State of Ohio, have invented certain new and useful Improvements in Planing-Machine Attachments, of which the following is a full, clear, and exact description, reference being had to the accompanying drawings, forming part of this specification.

The object of my invention is to provide an attachment for planing machines, for the cutting of spiral grooves in cylinders, particularly cylinders of such large diameters and size that they cannot be handled upon the ordinary milling machines or lathes.

A demand has arisen, especially in connection with printing machinery, for metallic cylinders of large diameters with spiral grooves cut in the cylindrical surface thereof, and heretofore costly special machinery has had to be designed and constructed for doing this work. No machine adapted for ordinary work is built of sufficiently large size to hold such cylinders.

It is the purpose of my invention to obviate this difficulty by providing an attachment for the table of a planing machine, which can be readily and easily secured in place, and which shall be adapted to hold and present to the cutting tool cylinders of any desired length and diameter.

Figure 2:
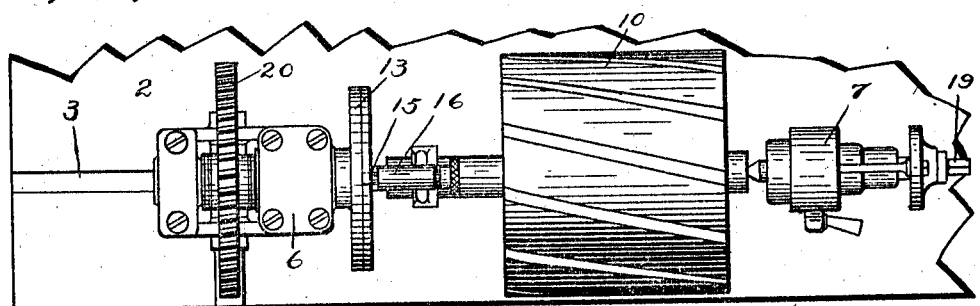
Figure 1:
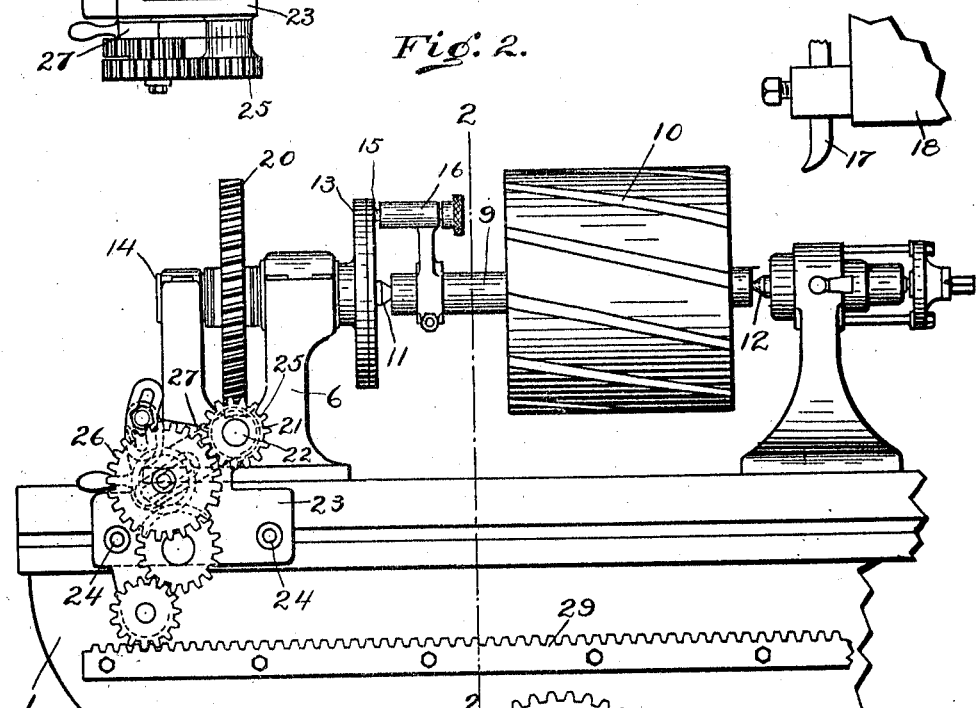
Figure 3:
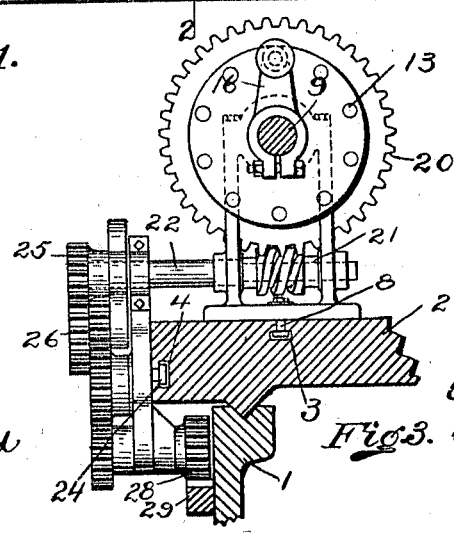

In the drawings Figure 1 is a side elevation of a portion of a planing machine, with my attachment mounted thereon. Fig. 2 is a top plan view of same, and Fig. 3 is a cross section taken on the lines 2, 2, of Fig. 1.

1 is a portion of the bed of a planing machine, and 2 a portion of the table therefor, provided with the T-slots 3 and 4 in the top and sides thereof, for securing the work on the table.

6 is the head stock and 7 the tail stock of my attachment for holding the cylinders, in which the spiral grooves are to be cut, and these supporting standards for the work are secured by the bolts 8 in the T-slots of the planing machine table.

9 is the mandrel or shaft, upon which the metallic cylinder 10, to be operated on, is mounted and this mandrel may be either a separate shaft upon which the work is secured, or the shaft of the cylinder itself may be held between the cone centers 11 and 12 on the head and tail stocks.

13 is the dividing or index plate, mounted on the shaft 14, journaled in the head stock, the index plate carrying the usual series of holes for adjusting the work, one of which is engaged by the index pin 15, mounted in the holder 16, which holder is clamped to the mandrel 9, and by means of which connection, the mandrel is driven at the desired rate of speed to slowly rotate the cylinder 10, in which the spiral grooves are to be cut as the planing table is advanced to the cutting tool 17, held by the planer head 18.

I have illustrated a simple cutting tool 17 for cutting the grooves, but it will be understood that any desired milling attachment carrying a rotating cutter can also be employed.

The tail stock of the attachment is provided with the usual set screw construction 19, for adjusting the dead center 12, to properly hold the mandrel.

The mandrel is driven by the spiral gear 20, keyed on the shaft 14, supported in the head stock, which gear meshes with spiral gear 21 on the shaft 22, journaled in the frame or plate 23, which is secured by the bolts 24, 24 in the T-slot 4 in the side of the table. The shaft 22 carries the gear 25 which meshes with the gear 26 mounted in the sector plate 27 of the usual construction, so that the gears may be changed as desired, and the gear 26 through a train of gears and pinions all mounted on the frame plate 23, is driven by the gear 28, which in turn meshes with the rack 29 horizontally bolted along one side to the bed of the machine.

The operation of the device will be apparent from the foregoing description.

It will be evident that within the capacity of the planing machine, spiral grooves may be cut of any desired pitch on metal cylinders, of a large diameter and considerable length, and which could not be cut with any ordinary milling machine. The head and tail stock and the plate holding the train of gears, can be readily and easily secured on the planer and when the work is completed the attachment may be readily and easily removed. By a proper change of gears as will be readily understood, the cylinders may be driven in either direction, so as to cut either a right or left hand spiral as the case may be. The advance of the table drives the train of gears by engagement with the fixed rack bar, and the work is brought up to the cutting tool, at the same time that the work is slowly rotated in either direction.

Having thus described my invention what I claim as new and desire to secure by Letters Patent, is:

The combination with a planing machine, comprising a bed frame, a relatively fixed head piece to hold a cutting tool in fixed position, and a table mounted to reciprocate lengthwise to and from the relatively fixed cutting tool, said table being provided with a longitudinal T-slot in its top surface and a longitudinal T-slot in its side edge, of a separable headstock and a separable tailstock, with supporting bases provided with head bolts for adjustably securing same in the T-slots of the table top, with supporting mandrel for the headstock, means for driving said mandrel under the movement of the table, comprising a frame plate with head bolts for securing same adjustably in the T-slot in the side edge of said table, a fixed rack secured to the bed frame of the planer, parallel with said T-slot, and a train of gearing mounted in said frame plate with connection therefor with the mandrel on one side and with the fixed frame on the other, whereby the movement of the planing table will drive the mandrel, and work of any size within the capacity of the planer may be operated upon.

CHARLES E. BEROLD.

Witnesses:
BESSIE A. BEALL,
ARTHUR H. EWALD.